United States Patent
Varunjikar et al.

(10) Patent No.: US 9,409,595 B2
(45) Date of Patent: Aug. 9, 2016

(54) PROVIDING ASSIST TORQUE WITHOUT HAND WHEEL TORQUE SENSOR FOR ZERO TO LOW VEHICLE SPEEDS

(71) Applicant: STEERING SOLUTIONS IP HOLDING CORPORATION, Saginaw, MI (US)

(72) Inventors: Tejas M. Varunjikar, Saginaw, MI (US); Anthony J. Champagne, Saginaw, MI (US); Timothy W. Kaufmann, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/486,392

(22) Filed: Sep. 15, 2014

(65) Prior Publication Data

US 2016/0075371 A1 Mar. 17, 2016

(51) Int. Cl.
*B62D 5/04* (2006.01)
*F16H 35/00* (2006.01)

(52) U.S. Cl.
CPC .............. *B62D 5/0484* (2013.01); *B62D 5/049* (2013.01); *B62D 5/0463* (2013.01); *B62D 5/04* (2013.01)

(58) Field of Classification Search
USPC ............ 701/42–43, 41; 180/421, 4, 443–444, 180/446; 74/388 PS
See application file for complete search history.

(56) References Cited

U.S. PATENT DOCUMENTS

| | | | | |
|---|---|---|---|---|
| 4,874,053 | A | * 10/1989 | Kimura | B62D 6/10 180/443 |
| 5,473,539 | A | * 12/1995 | Shimizu | B62D 5/0466 180/446 |
| 5,709,281 | A | 1/1998 | Sherwin et al. | |
| 5,919,241 | A | 7/1999 | Bolourchi et al. | |
| 5,927,421 | A | 7/1999 | Fukada | |
| 5,948,030 | A | 9/1999 | Miller et al. | |
| 5,992,557 | A | * 11/1999 | Nakamura et al. | 180/446 |
| 6,032,091 | A | * 2/2000 | Noro et al. | 701/42 |
| 6,152,254 | A | * 11/2000 | Phillips | 180/422 |

(Continued)

FOREIGN PATENT DOCUMENTS

| | | |
|---|---|---|
| CN | 100999223 B | 7/2007 |
| CN | 102806942 A | 12/2012 |

(Continued)

OTHER PUBLICATIONS

Road-Departure Prevention in an Emergency Obstacle Avoidance Situation; Katzourakis, D.I.; de Winter, J.C.F.; Alirezaei, M.; Corno, M.; Happee, R.; Systems, Man, and Cybernetics: Systems, IEEE Transactions on; vol. 44, Issue: 5 DOI: 10.1109/TSMC.2013.2263129; Publication Year: 2014, pp. 621-629.*

(Continued)

*Primary Examiner* — Cuong H Nguyen
(74) *Attorney, Agent, or Firm* — Cantor Colburn LLP

(57) ABSTRACT

A method of controlling an electric power steering system of a vehicle is provided. The method estimates steering rack force to be caused by a tire of the vehicle and a surface of a ground with which the tire is in contact in response to determining that one or more hand wheel torque sensors of the vehicle are not enabled. The method generates a steering assist torque command based on the estimated steering rack force. The method controls the electric power steering system using the steering assist torque command.

18 Claims, 6 Drawing Sheets

(56) References Cited

U.S. PATENT DOCUMENTS

| | | | |
|---|---|---|---|
| 6,223,852 B1* | 5/2001 | Mukai et al. | 180/446 |
| 6,250,419 B1* | 6/2001 | Chabaan et al. | 180/443 |
| 6,298,941 B1* | 10/2001 | Spadafora | 180/422 |
| 6,370,459 B1* | 4/2002 | Phillips | 701/41 |
| 6,588,541 B2 | 7/2003 | Norman et al. | |
| 6,742,620 B2 | 6/2004 | Eidam et al. | |
| 6,959,970 B2 | 11/2005 | Tseng | |
| 7,040,450 B2* | 5/2006 | Nagase et al. | 180/443 |
| 7,558,661 B2 | 7/2009 | Sundaram et al. | |
| 7,596,441 B2* | 9/2009 | Yokota et al. | 701/41 |
| 7,885,750 B2 | 2/2011 | Lu | |
| 7,954,593 B2* | 6/2011 | Dornhege et al. | 180/446 |
| 7,974,754 B2* | 7/2011 | Nakatsu | 701/41 |
| 7,975,801 B2 | 7/2011 | Tashiro | |
| 8,010,252 B2 | 8/2011 | Getman et al. | |
| 8,108,105 B2 | 1/2012 | Saruwatari et al. | |
| 8,165,770 B2 | 4/2012 | Getman et al. | |
| 8,219,283 B2 | 7/2012 | Recker et al. | |
| 8,666,605 B2* | 3/2014 | Delarche et al. | 701/42 |
| 8,666,607 B2* | 3/2014 | Kojo | 701/43 |
| 8,843,276 B2* | 9/2014 | Kojo et al. | 701/41 |
| 8,903,606 B2 | 12/2014 | Kleinau et al. | |
| 8,977,433 B2* | 3/2015 | Kojima | B62D 5/0463 180/446 |
| 8,977,437 B2* | 3/2015 | Tamaizumi et al. | 701/42 |
| 2002/0092696 A1 | 7/2002 | Bohner et al. | |
| 2002/0179362 A1 | 12/2002 | Norman et al. | |
| 2003/0074120 A1 | 4/2003 | Kleinau | |
| 2004/0024505 A1 | 2/2004 | Salib et al. | |
| 2004/0055810 A1* | 3/2004 | Chabaan | B62D 6/10 180/446 |
| 2004/0099469 A1* | 5/2004 | Koibuchi et al. | 180/421 |
| 2004/0117088 A1 | 6/2004 | Dilger | |
| 2005/0189163 A1* | 9/2005 | Barton | B60T 8/1764 180/446 |
| 2005/0206224 A1 | 9/2005 | Lu | |
| 2005/0206229 A1 | 9/2005 | Lu et al. | |
| 2005/0246085 A1 | 11/2005 | Salib et al. | |
| 2007/0299580 A1 | 12/2007 | Lin | |
| 2009/0024281 A1 | 1/2009 | Hwang et al. | |
| 2009/0125186 A1 | 5/2009 | Recker et al. | |
| 2009/0143938 A1 | 6/2009 | Nishimura | |
| 2009/0292421 A1 | 11/2009 | Williams et al. | |
| 2009/0294206 A1 | 12/2009 | Oblizajek et al. | |
| 2010/0100283 A1 | 4/2010 | Hales et al. | |
| 2011/0022272 A1 | 1/2011 | Hung et al. | |
| 2011/0218706 A1 | 9/2011 | Mori et al. | |
| 2012/0041644 A1 | 2/2012 | Turner | |
| 2012/0261209 A1* | 10/2012 | Shiino | G01L 5/221 180/446 |
| 2013/0024072 A1 | 1/2013 | Michelis et al. | |
| 2013/0073146 A1 | 3/2013 | Konomi et al. | |
| 2013/0151066 A1 | 6/2013 | Koukes et al. | |
| 2013/0261894 A1* | 10/2013 | Kojima | B62D 5/0463 701/41 |
| 2014/0324294 A1 | 10/2014 | Champagne | |
| 2015/0191200 A1* | 7/2015 | Tsubaki | B62D 15/0285 701/42 |

FOREIGN PATENT DOCUMENTS

| | | | | |
|---|---|---|---|---|
| CN | 102917939 A | | 2/2013 | |
| DE | 19634728 C1 | * | 4/1998 | B62D 5/04 |
| DE | 10344279 A1 | | 4/2004 | |
| DE | 102008051552 A1 | | 4/2009 | |
| DE | 102008036001 A1 | | 2/2010 | |
| EP | 0353995 A2 | | 2/1990 | |
| EP | 001508495 A2 | * | 2/2005 | B62D 5/04 |
| EP | 2028080 A1 | | 2/2009 | |
| EP | 1808359 B1 | | 4/2009 | |
| EP | 2184218 A2 | | 5/2010 | |
| EP | 2275323 A1 | | 1/2011 | |
| EP | 2223838 B1 | | 11/2011 | |
| EP | 2497698 A1 | | 9/2012 | |
| GB | 2454788 A | | 5/2009 | |
| JP | 2003002222 A | | 1/2003 | |
| JP | 3712876 B2 | | 11/2005 | |
| JP | 3819261 B2 | | 9/2006 | |
| JP | 2006248250 A | | 9/2006 | |
| JP | 2007514602 A | | 6/2007 | |
| JP | 2009051292 A | | 3/2009 | |
| JP | 2011051409 A | | 3/2011 | |
| KR | 2006083578 A | * | 7/2006 | B62D 5/04 |
| WO | 2005097577 A1 | | 10/2005 | |
| WO | PCT/JP05/06994 | * | 10/2006 | |
| WO | WO2012/066704 | * | 5/2012 | |
| WO | 2012176553 A1 | | 12/2012 | |
| WO | PCT/JP2012/061653 | * | 10/2013 | |

OTHER PUBLICATIONS

J. C. F. de Winter, M. Mulder, M. M. van Paassen, D. A. Abbink, and P. A. Wieringa, "A two-dimensional weighting function for a driver assistance system," IEEE Trans. Syst., Man, Cybern. B, Cybern., vol. 38, No. 1, pp. 189-195, Feb. 2008.*

D. I. Katzourakis, D. A. Abbink, R. Happee, and E. Holweg, "Steering force-feedback for human machine interface automotive experiments," IEEE Trans. Instrum. Meas., vol. 60, No. 1, pp. 32-43, Jan. 2011.*

Friction Compensation Control for Power Steering; Wilhelm, F.; Tamura, T.; Fuchs, R.; Mullhaupt, P.; Control Systems Technology, IEEE Transactions on ; Year: 2015, Volume: PP, Issue: 99; pp. 1-14, DOI: 10.1109/TCST.2015.2483561.*

Design considerations for control of traction drive with permanent magnet synchronous machine; Peroutka, Z.; Zeman, K. Power Electronics and Motion Control Conference, 2008. EPE-PEMC 2008. 13$^{th}$; Year: 2008; pp. 1529-1534, DOI: 10.1109/EPEPEMC.2008. 4635484.*

Vehicle velocity estimation by dynamic inversion of wheel force generation; Rehm, A.; Control Conference (ECC), 2009 European Year: 2009; pp. 4798-4803.*

Sensor fusion of delay and non-delay signal using Kalman Filter with moving covariance; Pornsarayouth, S.; Wongsaisuwan, M. Robotics and Biomimetics, 2008. ROBIO 2008. IEEE International Conference on; Year: 2009; pp. 2045-2049, DOI: 10.1109/ROBIO.2009. 4913316.*

Gillespie, T.D.; "Fundamentals of Vehicle Dynamics"; Warrendale, PA; Society of Automotive Engineers; 1992; ISBN 1560911999, 9781560911999; pp. 205-206.

van der Jagt, Pim; "Prediction of Steering Efforts During Stationary or Slow Rolling Parking Maneuvers"; Ford Forschungszentrum Aachen GmbH.; Oct. 27, 1999; 20 pages.

European Search Report for Application No. 14166178.5 dated Aug. 22, 2014; 7 pages.

Extended European Search Report for related European Application No. EP14192466.2 dated Apr. 9, 2015, 8 pages.

English Translation of Chinese Office Action for related CN Application No. 20121058416.7; Issued Dec. 3, 2014; 15 pages.

English Translation of Chinese Office Action for related CN Application No. 201210586416.7; Issued Aug. 12, 2015; 14 pages.

English Translation of CN Office Action & Search Report for related CN Application No. 201410086920.X; Issued Nov. 5, 2015; 10 pages.

Extended EP Search Report for related EP Application No. 12192967.3, dated Apr. 2, 2013; 8 pages.

Extended European Search Report for related EP Application No. 14156987.1; dated Jan. 21, 2015; 8 pages.

Extended European Search Report for related EP Application No. 15173865.5; dated Nov. 23, 2015; 10 pages.

* cited by examiner

US 9,409,595 B2

PROVIDING ASSIST TORQUE WITHOUT HAND WHEEL TORQUE SENSOR FOR ZERO TO LOW VEHICLE SPEEDS

BACKGROUND OF THE INVENTION

In a typical electric power steering (EPS) system of a vehicle, a hand wheel torque sensor is used to determine the driver requested assist torque. When the hand wheel torque sensor becomes un-enabled and does not function properly, the EPS system may not be able to provide the steering assist torque. Accordingly, it is desirable to have an EPS system that better handles a situation of an un-enabled hand wheel torque sensor.

SUMMARY OF THE INVENTION

In one embodiment of the invention, a method of controlling an electric power steering system of a vehicle is provided. The method estimates steering rack force to be caused by a tire of the vehicle and a surface of a ground with which the tire is in contact in response to determining that one or more hand wheel torque sensors of the vehicle are not enabled. The method generates a steering assist torque command based on the estimated steering rack force. The method controls the electric power steering system using the steering assist torque command.

In another embodiment of the invention, a system of a vehicle comprises a control module and a power steering system that includes one or more hand wheel torque sensors. The control module is configured to estimate steering rack force to be caused by a tire of the vehicle and a surface of a ground with which the tire is in contact in response to determining that one or more of the hand wheel torque sensors are not enabled. The control module is further configured to generate a steering assist torque command based on the estimated steering rack force. The control module is further configured to control the electric power steering system using the steering assist torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
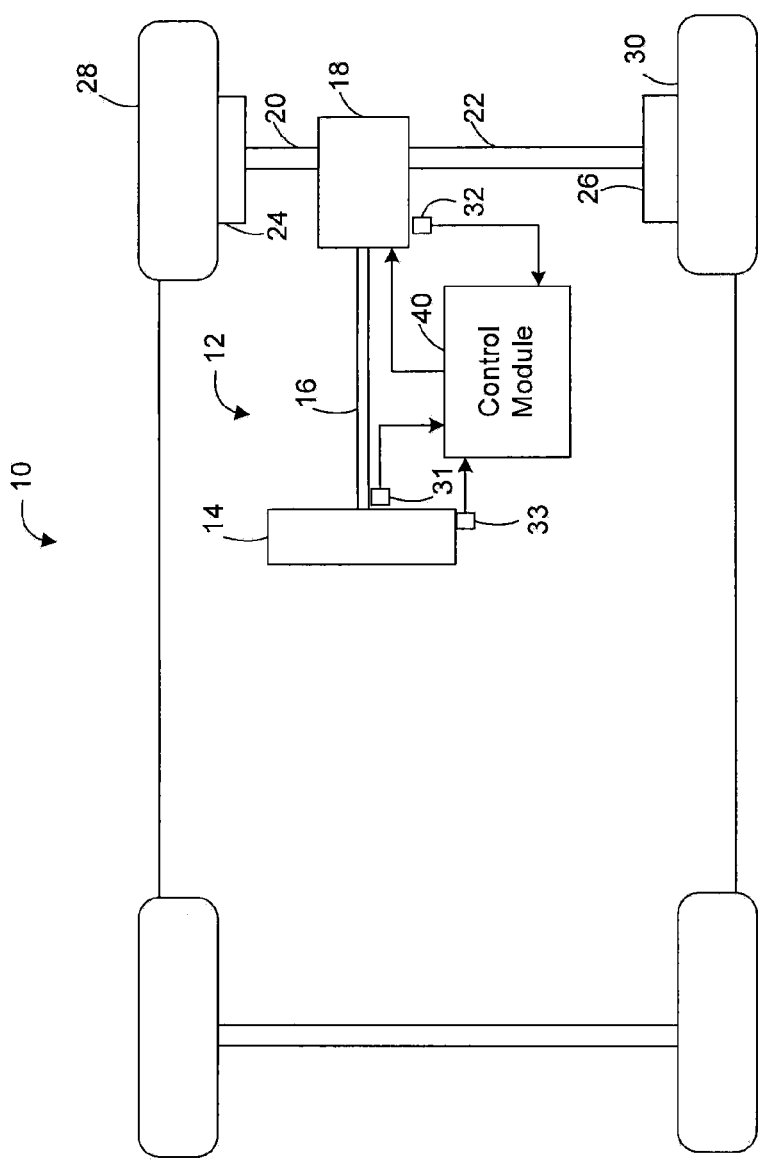
FIG. 1 illustrates a functional block diagram of a steering system that includes an assist torque calculation system in accordance with exemplary embodiments of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (i.e., a driver), the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 periodically or continuously generate sensor signals based on the observable conditions. In various embodiments, the sensors 31-33 include, for example, a hand wheel torque sensor, a hand wheel angle sensor, a hand wheel velocity sensor, roadway wheel velocity sensors, and other sensors. In one embodiment, some of these sensors have redundant or backup sensors to validate or complement the sensor signals. The sensors 31-33 send the signals to the control module 40.

In various embodiments, a control module 40 controls the operation of the steering system 12 and/or the vehicle 10 based on one or more of the enabled sensor signals and further based on the assist torque calculation systems and methods of the present disclosure. Generally speaking, the methods and systems in various embodiments of the invention generate an assist torque command without using a hand wheel torque signal, which typically indicates the driver-requested assist, when the hand wheel torque sensor supplying the hand wheel torque signal becomes un-enabled or faulty. Specifically, the methods and systems utilize a modified static tire model to estimate rack load or steering rack force when the vehicle is stationary or moving at a relatively low velocity (e.g., at about 10 kilometers per hour or below). The methods and systems generate a scale factor based on the hand wheel angle, the hand wheel velocity, the vehicle velocity and a previously generated assist torque command. The methods and systems generate an assist torque command by scaling the estimated steering rack force with the scale factor.

Figure 2:
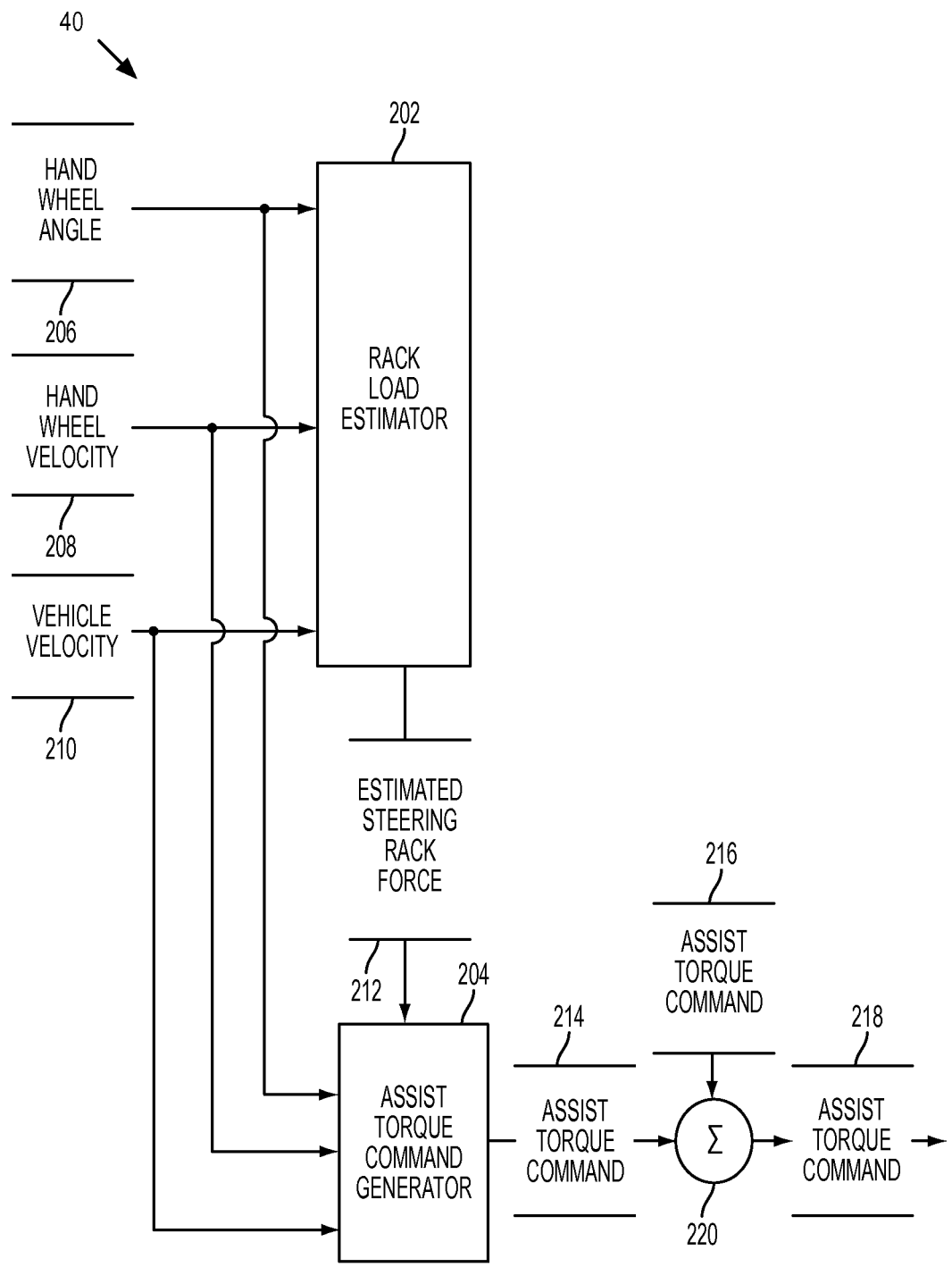
FIG. 2 illustrates a dataflow diagram illustrating an assist torque calculation system in accordance with exemplary embodiments of the invention.

FIG. 2 depicts a dataflow diagram of the control module 40 of FIG. 1 that is used to control the steering system 12 and/or the vehicle 10 of FIG. 1. In various embodiments, the control module 40 can include one or more sub-modules and datastores, such as a rack load estimator 202 and an assist torque command generator 204. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate an assist torque command. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined.

As known, rack load or steering rack force is caused by one or more tires of the vehicle and the surface of the ground with which the tires are in contact as the tire plane(s) relative to the surface is rotated (by steering the hand wheel). In order to steer the hand wheel to the desired position, the steering rack force has to be overcome by a torque in addition to a torque to rotate the hand wheel. The rack load estimator 202 is configured to estimate the steering rack force and generates an estimated steering rack force signal 212 indicating the steering rack force based on a hand wheel angle or position signal 206, a hand wheel velocity signal 208 and a vehicle velocity signal 210. The hand wheel angle signal 206, the hand wheel velocity signal 208 and the vehicle velocity signal 210 indicate hand wheel angle values, hand wheel velocity values and vehicle velocity values, respectively, detected by the various sensors 31-33 of FIG. 1. In some embodiments, the hand wheel velocity signal 208 may be derived from the hand wheel angle signal 206 based on an algorithm for calculating hand wheel velocity values from the hand wheel angle values at different instances in time, instead of being generated by a hand wheel velocity sensor. In some embodiments, the rack load estimator 202 utilizes a modified static tire model to estimate the steering rack force. More details about the rack load estimator 202 and the modified static tire model will be described further below by reference to FIG. 3.

The assist torque command generator 204 generates an assist torque command 214, which is periodic or continuous signal indicative of the amount of assist torque. The assist torque command 214 is for commanding the motor of the steering assist unit 18 of FIG. 1 to generate assist torque to aid the driver of the vehicle when the vehicle is stationary or moving at a relatively low velocity (e.g., at about 10 kilometers per hour (kph) or below). Specifically, the assist torque command generator 204 generates a scale factor based on the hand wheel angle signal 206, the hand wheel velocity signal 208 and the vehicle velocity signal 210. The assist torque command generator 204 generates the assist torque command 214 by scaling the estimated steering rack force signal 212 with the scale factor. More details about the assist torque command generator 204 will be described further below by reference to FIG. 4.

In some embodiments, the assist torque command 214 is blended by the blender 220 with another assist torque command 216, which is also generated without using a hand wheel torque signal from a hand wheel torque sensor. Specifically, the assist torque command 216 is generated by other sub-modules (not shown) of the control module 40 based on a lateral acceleration of the vehicle estimated from the hand wheel angle signal. In some embodiments, the blender 220 blends the assist torque commands 214 and 216 by adding the commands. Generating the assist torque command 216 is described in U.S. patent application Ser. No. 14/263,162, filed Apr. 28, 2014, which is incorporated herein by reference in its entirety. In these embodiments, a blend of the assist torque commands 214 and 216 is sent to the motor as an assist torque command 218.

Figure 3:
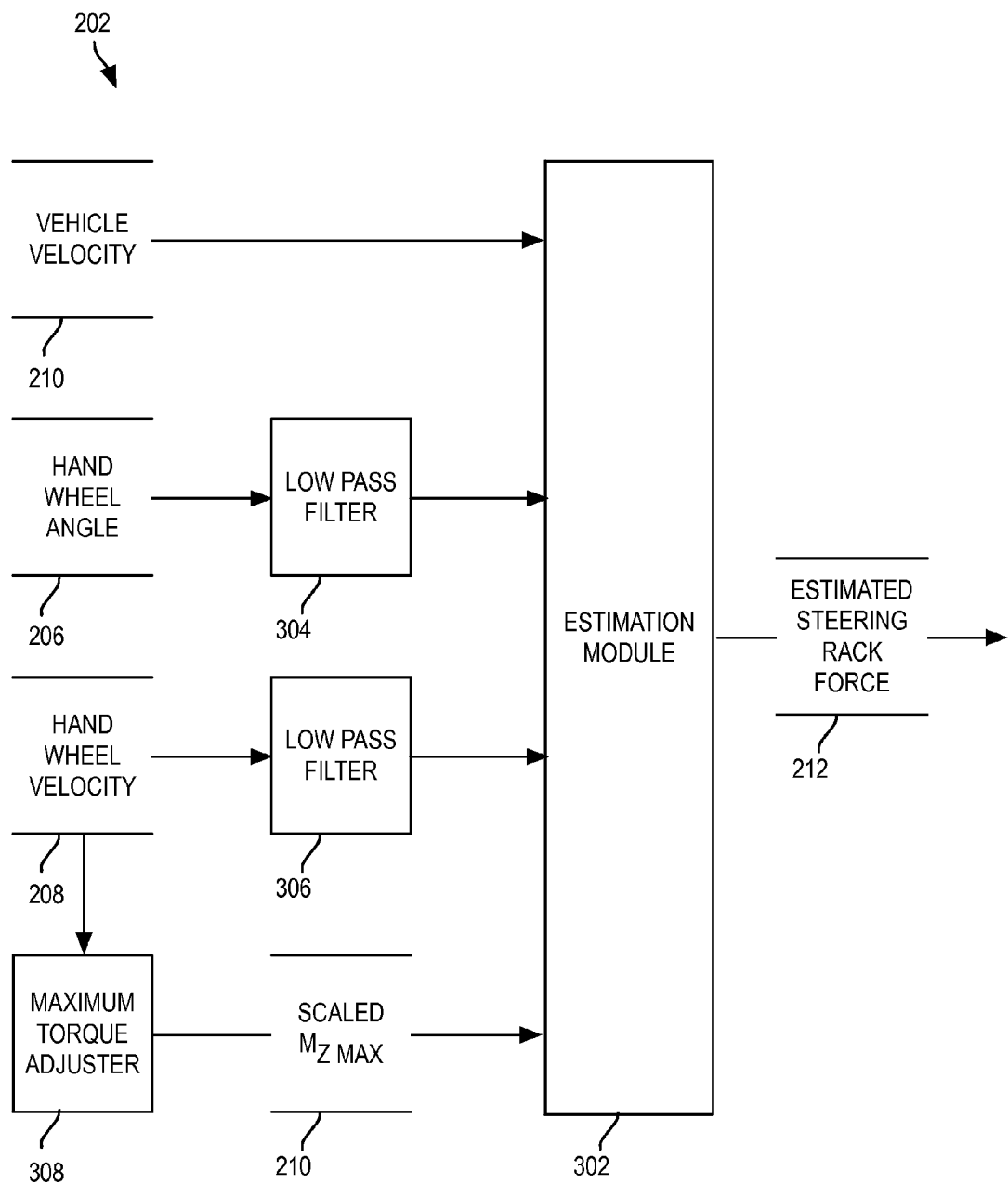
FIG. 3 depicts a dataflow diagram of a rack load estimator in accordance with exemplary embodiments of the invention.

FIG. 3 depicts a dataflow diagram of the rack load estimator 202 of FIG. 2, which utilizes a modified static tire model to estimate the steering rack force. A static tire model for estimating hand wheel torque is described in van der Jagt, Pim, "Prediction of Steering Efforts During Stationary or Slow Rolling Parking Maneuvers," Ford Forschungszentrum Aachen GmbH., Oct. 27, 1999, which is incorporated herein by reference in its entirety. This static tire model is referred to as "Van der Jagt static tire model" in the present disclosure. In some embodiments, the rack load estimator 202 utilizes a modified Van der Jagt static model to estimate the hand wheel torque.

The Van der Jagt static model includes the following equation for estimating steering rack force to be caused by the tire and the surface of the ground with which the tire is in contact:

$$M_z = K_\Psi \cdot \Psi \quad \text{(Equation 1)}$$

where $K_\Psi$ is the torsional stiffness of the tire; $\Psi$ is the yaw angle of the wheel plane for the tire; and $M_z$ is the steering rack force to be caused by the tire. Different tires have different torsional stiffness.

The Van der Jagt static model further includes the following two equations:

$$\dot{\Psi}_{def} = (1 - |M_z/M_{zmax}|) \cdot \dot{\Psi} \text{ if } \text{sign}(\Psi_{def}) = \text{sign}(\dot{\Psi}) \quad \text{(Equation 2)}$$

$$\dot{\Psi}_{def} = \dot{\Psi} \text{ if } \text{sign}(\Psi_{def}) \neq \text{sign}(\dot{\Psi}) \quad \text{(Equation 3)}$$

where $\dot{\Psi}$ is a time derivative of the yaw angle $\Psi$ of the wheel plane; $\Psi_{def}$ is the torsional deflection (i.e., deformation angle) of the tire as the hand wheel rotates; $\dot{\Psi}_{def}$ is a time derivative of $\Psi_{def}$; $M_{z\,max}$ is the maximum torque that can be generated by the tire; and sign( ) is a function that returns the sign (e.g., a positive and a negative) of the input value. Equation 2 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are the same). Equation 3 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are opposite). Equations 2 and 3 show nonlinearities between the steering rack force and the hand wheel angle.

The Van der Jagt static model further includes the following equations for estimating the steering rack force when the vehicle is stationary:

$$\Psi_{def\,m} = M_{zmax}/K_\Psi \quad \text{(Equation 4)}$$

$$\Psi_{def} = \int_0^t \dot{\Psi}_{def} \partial t \quad \text{(Equation 5)}$$

$$M_z = K_\Psi \cdot \Psi_{def} \quad \text{(Equation 6)}$$

where $\Psi_{def\,m}$ is the maximum possible deflection of the tire. Equation 4 shows that the maximum possible deflection of the tire before the tire starts to slip may be calculated by dividing the maximum torque that can be generated by the tire by the torsional stiffness of the tire. Equation 5 shows that the deflection of the tire builds up as the hand wheel rotates.

Equation 6 shows that is the steering rack force $M_z$ is estimated by multiplying the torsional stiffness of the tire by the torsional deflection of the tire.

The Van der Jagt static model further includes the following equations for estimating the steering rack force when the vehicle is moving at a relatively slow velocity (e.g., 10 kph or below):

$$\Psi_{def2} = \frac{1}{\tau} \cdot \Psi_{def} \quad \text{(Equation 7)}$$

$$\tau = X_{rel}/(\omega \cdot r) \quad \text{(Equation 8)}$$

$$\Psi_{def} = \int_0^t (\dot{\Psi}_{def} + \dot{\Psi}_{def2}) \cdot \partial t \quad \text{(Equation 9)}$$

where $\tau$ is a time constant; $\dot{\Psi}_{def2}$ is a time derivative of $\Psi_{def}$; $X_{rel}$ is the tire relaxation length; $\omega$ is the tire rotational velocity; and r is the tire rolling radius. In the Van der Jagt model, it is assumed that the tire have about two thirds of the steady state values (e.g., torsional stiffness and torsional deflection of the tire when the vehicle is stationary) after the tire has rolled over the tire relaxation length. Accordingly, $\tau$ indicates that at time r the tire has about two thirds of its steady state value.

In some embodiments, the rack load estimator 202 includes one or more sub-modules and datastores, such as low pass filters 304 and 306, a maximum torque adjuster 308 and an estimation module 302. The rack load estimator 202 uses a modified Van der Jagt static model to estimate the steering rack force. Specifically, the low pass filters 304 and 306 filter the hand wheel angle signal 206 and the hand wheel velocity signal 208, respectively. The low pass filters 304 and 306 remove noise from the hand wheel angle signal 206 and the hand wheel velocity signal 208 and add a time delay to the hand wheel angle signal 206 and the hand wheel velocity signal 208. This time delay makes the estimation of the steering rack road more accurate because the delay synchs up the phases of the hand wheel angle signal 206 and the hand wheel velocity signal 208 with the motion of the tire. The motion of the hand wheel precedes the motion of the tire because the motion of the tire is caused by the motion of the hand wheel.

The estimation module 302 modifies the Van der Jagt static tire model by replacing the tire steering coordinates in the equations 1-9 of the Van der Jagt static tire model with the hand wheel angle values, the hand wheel velocity values and the vehicle velocity values. For instance, the hand wheel angle is used instead of the yaw angle $\Psi$ of the wheel plane for the tire, and the hand wheel velocity is used instead of the time derivative $\dot{\Psi}$ of the yaw angle $\Psi$ of the wheel plane.

The maximum torque adjuster 308 further modifies the equations of the Van der Jagt static tire model by adjusting the maximum torque value that can be generated by the tire. In the Van der Jagt static tire model, it is assumed that the surface of the ground is a dry pavement. That is, it is assumed that the surface friction is a constant. In order to make the estimation of the steering rack force in light of the road friction changes, nonlinearities and other un-modeled dynamics, the maximum torque adjuster 308 scales down the maximum torque $M_{z\,max}$ that can be generated by the tire.

In some embodiments, the maximum torque adjuster 308 generates a scalar factor based on the hand wheel velocity and scales down $M_{z\,max}$ by multiplying $M_{z\,max}$ by the scale factor. Specifically, the maximum torque adjuster 308 uses a threshold hand wheel velocity value that is determined empirically. The threshold hand wheel velocity is used for determining whether the hand wheel velocity indicates that the vehicle is on a low friction surface. That is, in some embodiments, if the hand wheel velocity is greater than the threshold hand wheel velocity, the maximum torque adjuster 308 determines that the vehicle is on a low friction surface (e.g., on an icy road) and sets the scale factor to a small value (e.g., 1/20 or 0.05). If the hand wheel velocity is less than or equal to the threshold hand wheel velocity, the maximum torque adjuster 308 determines that the vehicle is not on a low friction surface and sets the scale factor to a value (e.g., one) in order not to scale down $M_{z\,max}$. In some embodiments, the maximum torque adjuster 308 limits the rate of the change of the scaling factor in order to scale $M_{z\,max}$ smoothly. For instance, the maximum torque adjuster 308 limits the rising rate to 0.05 (i.e., the scaling factor increases such that $M_{z\,max}$ rises by 0.05 times per unit time) and limits the decreasing rate to −50 (i.e., the scaling factor decreases by not more than 50 times for a unit time). The maximum torque adjuster 308 multiplies $M_{z\,max}$ by the scale factor to scale $M_{z\,max}$. The maximum torque adjuster 308 sends the scaled $M_{z\,max}$ 310 to the estimation module 302, which generates the estimated steering rack force signal 212.

Figure 4:
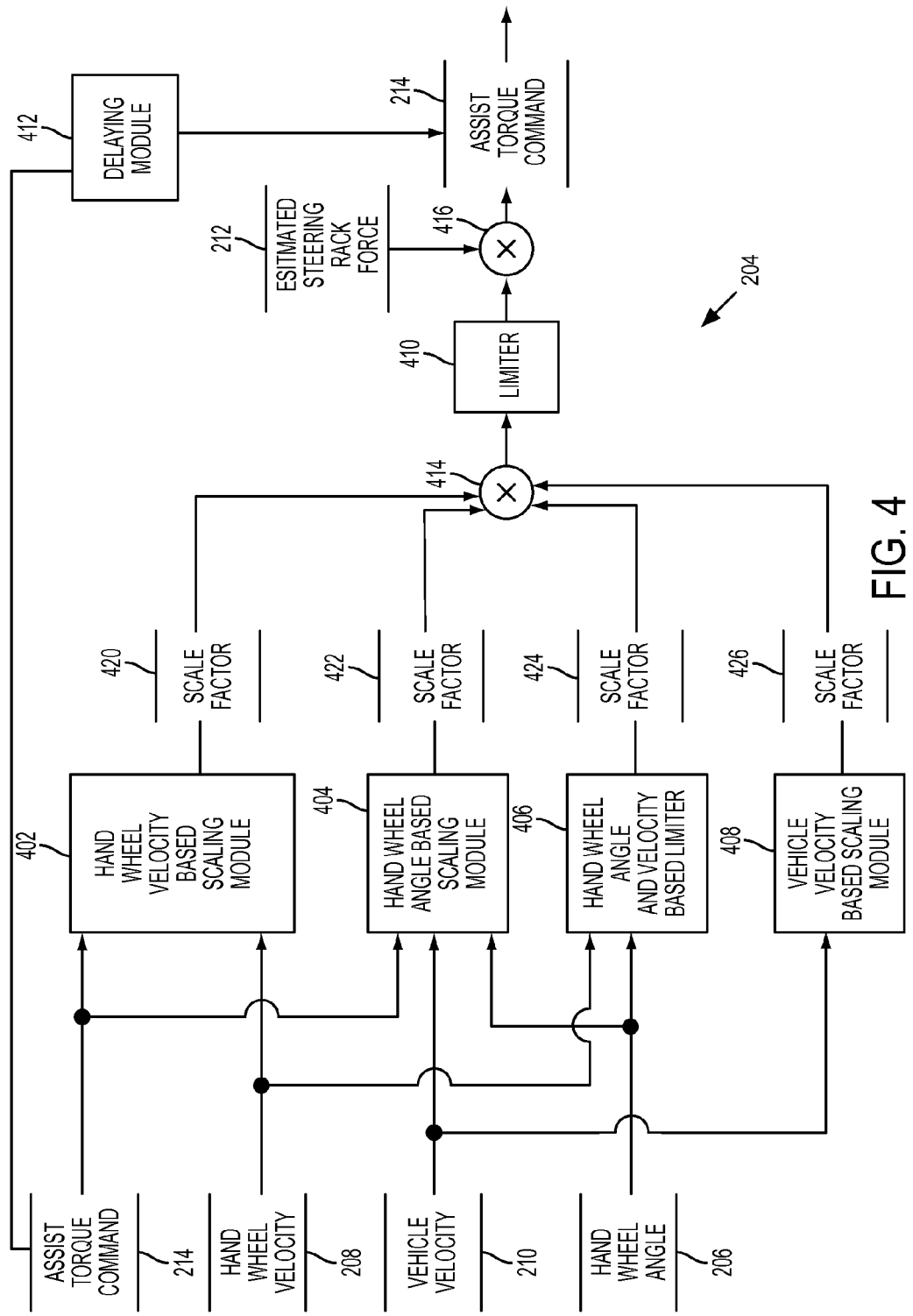
FIG. 4 depicts a dataflow diagram of an assist torque command generator in accordance with exemplary embodiments of the invention.

FIG. 4 depicts a dataflow diagram of the assist torque command generator 204 of FIG. 2. In some embodiments, the assist torque command generator 204 includes one or more sub-modules and datastores, such as a hand wheel velocity based scaling module 402, a hand wheel angle based scaling module 404, a hand wheel velocity and angle based limiter 406, a vehicle velocity based scaling module 408, a limiter 410, a delaying module 412, and multipliers 414 and 416.

The hand wheel velocity based scaling module 402 takes as input the assist torque command 214 previously generated by the assist torque command generator 204 and the hand wheel velocity signal 208. The hand wheel velocity based scaling module 402 generates a scale factor 420 to use to scale down the estimated steering rack force signal 212. The estimated steering rack force signal 212 is scaled with the scale factor 420 such that the output assist torque command 214 generated from the estimated steering rack force signal 212 provides the natural return of the hand wheel to the centered position in the absence of driver-provided torque to the hand wheel.

In some embodiments, the hand wheel velocity based scaling module 402 sets the scale factor 420 to a value (e.g., 0.3) to ramp down the estimated steering rack force signal 212 to 30% when the hand wheel velocity is less than a threshold velocity. The hand wheel velocity based scaling module 402 sets the scale factor 420 to ramp up the estimated steering rack force signal 212 to full values (e.g., about 100%) when the hand wheel velocity is greater than a threshold velocity. The scaling factor 420 is used to ramp up the estimated steering rack force signal 212 when the assist torque command 214 indicates assist torque that is in the same direction as the hand wheel velocity signal 208. The scaling factor 420 is used to ramp down the assist torque command when the assist torque command is in the opposite direction as the hand wheel velocity (i.e., when the assist torque command 214 and the hand wheel velocity have different signs—quadrants II and IV). An example of the hand wheel velocity based scaling module 402 is described in the above-incorporated U.S. patent application Ser. No. 14/263,162.

The hand wheel angle based scaling module 404 takes as input the assist torque command 214 previously generated by the assist torque command generator 204, the vehicle velocity signal 210 and the hand wheel angle signal 206. The hand wheel angle based scaling module 404 generates a scale factor 422 to use to scale down the estimated steering rack force signal 212. The estimated steering rack force signal 212 is scaled with the scale factor 422 such that the output assist torque command 214 generated from the estimated steering rack force signal 212 provides the natural return of the hand wheel to the centered in the absence of driver-provided torque to the hand wheel. More details of the hand wheel angle based scaling module 404 are described further below by reference to FIG. 5.

The hand wheel velocity and angle based limiter 406 takes as input the hand wheel velocity signal 208 and the hand wheel angle signal 206. The hand wheel velocity and angle based limiter 406 generates a scale factor 424 to use to scale down the estimated steering rack force signal 212. The estimated steering rack force signal 212 is scaled with the scale factor 424 such that the output assist torque command 214 generated from the estimated steering rack force signal 212 does not over-assist the driver (i.e., provides assist torque no more than necessary).

In some embodiments, the hand wheel velocity and angle based limiter 406 determines a first gain value using a first gain table indexed by the hand wheel angle values indicated by the hand wheel angle signal 206. The first gain table returns a constant gain (e.g., one) for the hand wheel angle values below a threshold hand wheel angle. The gain value that the first gain table returns gets smaller for a hand wheel angle value above the threshold hand wheel angle as the hand wheel angle value increases. Likewise, the hand wheel velocity and angle based limiter 406 determines a second gain value using a second gain table indexed by the hand wheel velocity values indicated by the hand wheel velocity signal 208. The second gain table returns a constant gain (e.g., one) for the hand wheel velocity values below a threshold hand wheel velocity. The gain value that the second gain table returns gets smaller for a hand wheel velocity value above the threshold hand wheel velocity as the hand wheel velocity value increases. The hand wheel velocity and angle based limiter 406 multiplies the first gain value by the second gain value. The hand wheel velocity and angle based limiter 406 then limits the rate of the change of the product of the first and second gain values to a range so that the value of the product changes smoothly. The resulting product is the scale factor 424.

The vehicle velocity based scaling module 408 takes as input the vehicle velocity signal 210. The vehicle velocity based scaling module 408 generates a scale factor 426 to use to scale down the estimated steering rack force signal 212. The estimated steering rack force signal 212 is scaled with the scale factor 426 such that the output assist torque command 214 generated from the estimated steering rack force signal 212 is scaled down progressively to zero as the vehicle velocity increases. Specifically, in some embodiments, the vehicle velocity based scaling module 408 determines a speed dependent gain using a speed dependent gain table that is indexed by the vehicle velocity values indicated by the vehicle velocity signal 210. The gain value that this speed dependent gain table returns gets larger as the vehicle velocity increases. The gain value saturates once the vehicle velocity reaches above a threshold vehicle velocity. This vehicle velocity based scaling module 408 then limits this gain value to a range (e.g., a range from zero to one). The resulting gain value is the scale factor 426.

In some embodiments, the multiplier 414 multiples the four scale factors 420, 422, 424 and 426 together and sends this product of the four scale factors to the limiter 410, which limits this product to a range (e.g., a range from zero to one). The multiplier 416 then generates the output assist torque command 214 by multiplying the estimated steering rack force by the product of the four scale factors. The output assist torque command 214 is delayed by the delaying module 412 by, for example, a unit time and then is supplied to the hand wheel velocity based scaling module 402 and the hand wheel angle based scaling module 404. Also, as discussed above by reference to FIG. 2, the assist torque command 214 gets blended with the assist torque command 216 in some embodiments.

Figure 5:
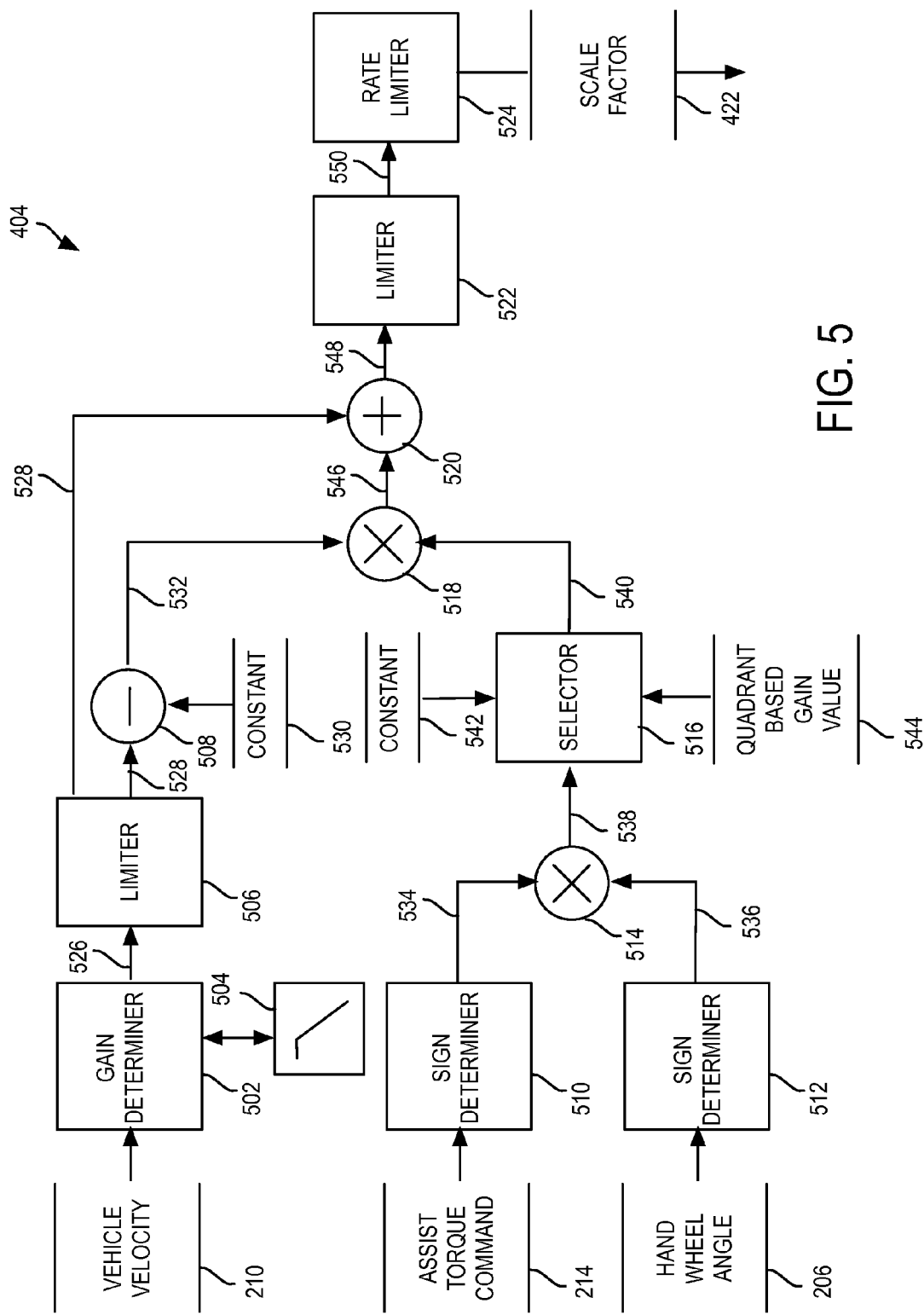
FIG. 5 depicts a dataflow diagram of a hand wheel angle based scaling module in accordance with exemplary embodiments of the invention.

FIG. 5 depicts a dataflow diagram of the hand wheel angle based scaling module 404 of FIG. 4. In some embodiments, the hand wheel angle based scaling module 404 includes one or more sub-modules and datastores, such as a gain determiner 502, a vehicle velocity dependent gain table 504, a limiter 506, a subtractor 508, sign determiners 510 and 512, a multiplier 514, a selector 516, a multiplier 518, a blender 520, a limiter 522, and a rate limiter 524. As described above, the hand wheel angle based scaling module 404 takes as input the assist torque command 214 previously generated by the assist torque command generator 204, the vehicle velocity signal 210 and the hand wheel angle signal 206.

The gain determiner 502 determines a speed dependent gain signal 526 based on the vehicle velocity 210. Specifically, in some embodiments, the gain determiner 502 uses the vehicle velocity dependent gain table 504, which is indexed by the vehicle velocity values indicated by the vehicle velocity signal 210. The speed dependent gain table 504 returns a constant (e.g., one) for a vehicle velocity that is below a threshold vehicle velocity. A gain value that the speed dependent gain table 504 returns gets smaller for a vehicle velocity value above the threshold vehicle velocity as the vehicle velocity value increases.

The limiter 506 limits the speed dependent gain signal 526 to a range of gain values (e.g., a range from zero to one) to generate a limited speed dependent gain signal 528. The subtractor 508 then subtracts the limited speed dependent gain signal 528 from a constant 530 (e.g., one) to generate a gain signal 532.

The sign determiners 510 and 512 each take an input signal and generate a sign signal based on the sign of the input signal values. For instance, when the input signal indicates a negative value, the sign determiners generate −1. When the input signal indicates a positive value, the sign determiners generate +1. When the input signal indicates a zero, the sign determiners generate a zero. The sign determiner 510 takes as an input signal the assist torque command 214 and generates a sign signal 534. The sign determiner 512 takes as an input signal the hand wheel angle signal 206 and generates a sign signal 536.

The multiplier 514 generates a quadrant signal 538 by multiplying the two sign signals 534 and 536. When the quadrant signal 538 indicates a negative value, it means that the sign of the assist torque command 214 is different than the sign of the hand wheel angle 215 (i.e., the second or fourth quadrant in a two-dimensional coordinate system in which the hand wheel angle values and the assist torque values make up the two axis). That is, the hand wheel is steered to the left of the center position and the assist torque indicated by the assist torque command 214 points right, or the hand wheel is steered to the right of the center position and the assist torque points left. When the quadrant signal 538 indicates a positive value, it means that the sign of the assist torque command 214 is the same as the sign of the hand wheel angle 215 (i.e., the first or third quadrant). That is, the hand wheel is steered to the left of the center position and the assist torque indicated by the assist torque command 214 points left, or the hand wheel is steered to the right of the center position and the assist torque points right. When the quadrant signal 538 is a zero, it means either the hand wheel is at the center position or the assist torque indicates by the assist torque command 214 is a zero (i.e., the hand wheel is stationary).

Based on the quadrant signal 538, the selector 516 generates a gain signal 540. Specifically, the selector 516 selects a quadrant based gain value 544 as the gain signal 540 if the quadrant signal 538 indicates a negative value. In some embodiments, the quadrant based gain value 544 is predetermined based on different possible quadrant signal values. The selector 516 selects a constant 542 (e.g., one) as the gain signal 540 if the quadrant signal 538 does not indicate a negative value (i.e., the quadrant signal 538 indicates a positive value or a zero).

The multiplier 518 multiplies the gain signal 532 from the subtractor 508 by the gain signal 540 from the selector 516 to generate a scale factor 546. The blender 520 blends (e.g., adds) the scale factor 546 with the limited speed based gain signal 528 from the limiter 506 to generate a scale factor 548. The limiter 522 limits the scale factor 548 to a range of gain values (e.g., a range from zero to one) to generate a limited speed factor 550. The rate limiter 524 then limits the rate of the change of the limited scale factor 550 to a range so that the value of the limited scale factor 550 changes smoothly over time. The output signal of the rate limiter 524 is the scale factor 422.

Figure 6:
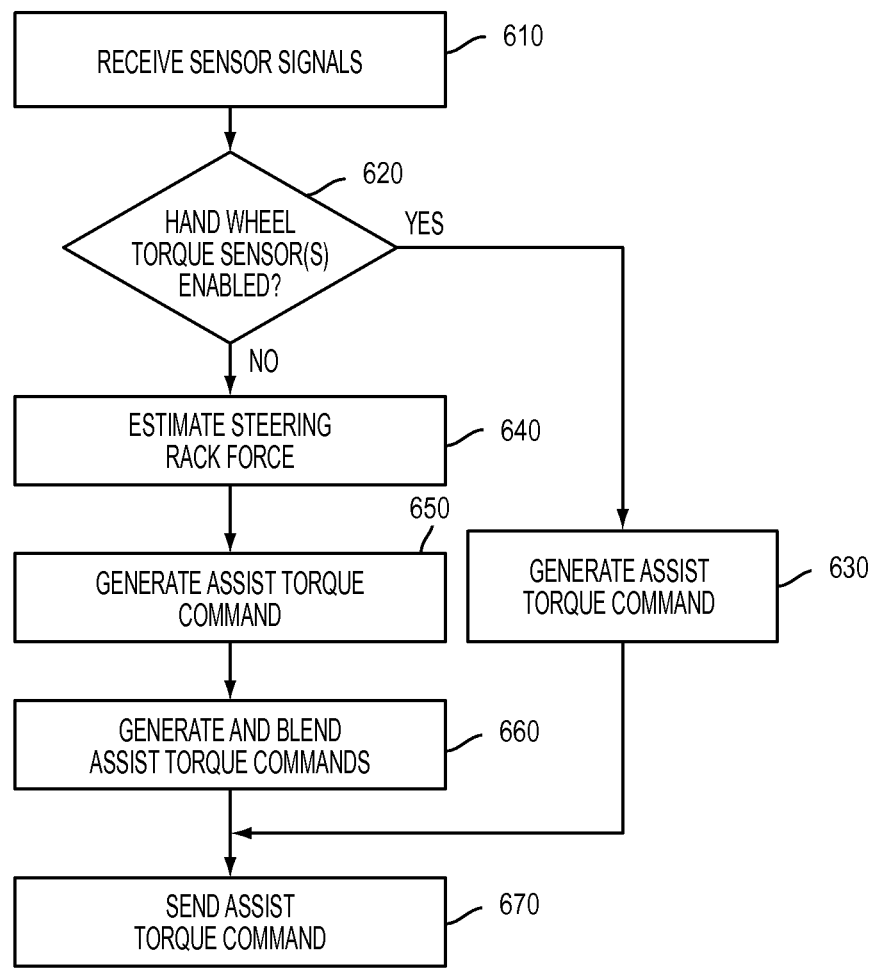
FIG. 6 illustrates a flow diagram of an assist torque command generation method in accordance with exemplary embodiments of the invention.

Referring now to FIG. 6, a flow diagram illustrates an assist torque command generation method that can be performed by the control module 40 of FIG. 1. As can be appreciated in light of the disclosure, the order of operation within the method is not limited to the sequential execution as illustrated in FIG. 6, but may be performed in one or more varying orders as applicable and in accordance with the present disclosure. In various embodiments, the method can be scheduled to run based on predetermined events, and/or run continually during operation of the vehicle 10.

At block 610, the control module 40 receives sensor signals from the sensors 31-33 of FIG. 1. The control module 40 then determines at block 620 whether one or more hand wheel torque sensors of the vehicle 10 are enabled or operating properly. The control module 40 may determine whether the hand wheel torque sensors are enabled by, for example, analyzing the hand wheel torque signals from the sensors. When the control module 40 determines that one or more hand wheel torque sensors are not enabled, the control module 40 proceeds to block 640, which will be described further below. When the control module 40 determines that one or more hand wheel torque sensors are enabled and that at least one hand wheel torque sensor signal is usable, the control module 40 at block 630 generates an assist torque command using the torque sensor signal.

At block 640, the control module 40 estimates or predicts steering rack force to be caused by a tire of the vehicle and a surface of a ground with which the tire is in contact when the vehicle is stationary or moving at a relatively low velocity that is below a threshold velocity. In some embodiments, the control module 40 uses a modified static tire model to estimate the steering rack force. The control module 40 may filter the hand wheel angle signal 206 and the hand wheel velocity signal 208 with the low pass filters 304 and 306, respectively, in order to remove noise from the signals and apply a delay to the signals. The control module 40 may also scale down a maximum value of torque, which the tire is capable of generating, based on the vehicle velocity signal 210.

At block 650, the control module 40 generates the assist torque command 214 based on the steering rack force estimated at block 640. Specifically, in some embodiments, the control module 40 scales down the estimated steering rack force with a product of a plurality of scale factors in order to generate the assist torque command 214 from the estimated steering rack force. The control module 40 generates one scale factor based on previously generated assist torque command 214, the vehicle velocity signal 210 and the hand wheel angle signal 206. The control module 40 generates another scale factor based on the hand wheel angle signal 206 and the hand wheel velocity signal 208. The control module 40 generates another scale factor based on the assist torque command 214, the vehicle velocity signal 210 and the hand wheel angle signal 206. The control module 40 generates another scale factor based on the vehicle velocity signal 210.

At block 660, the control module 40 optionally blends the assist torque command generated at block 640 with another assist torque command the control module 40 may generate. In some embodiments, the control module 40 generates the other assist torque command 216 based on a lateral acceleration of the vehicle estimated from the hand wheel angle signal.

At block 670, the control module 40 controls the EPS system by sending the assist torque command generated at block 630 or 650 or the blend generated at block 660 to the motor of the EPS system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling an electric power steering system of a vehicle, the method comprising:
    filtering a hand wheel angle with a low-pass filter;
    filtering a hand wheel velocity with a low-pass filter;
    determining that one or more hand wheel torque sensors of the vehicle are not enabled;
    estimating steering rack force caused by a tire of the vehicle and a surface of a ground with which the tire is in contact with the filtered hand wheel angle and the filtered hand wheel velocity;
    generating a steering assist torque command based on the estimated steering rack force; and
    controlling the electric power steering system using the steering assist torque command.

2. A system of a vehicle comprising:
    a power steering system that includes one or more hand wheel torque sensors; and
    a control module configured to:
        filter a hand wheel angle with a low-pass filter;
        filter a hand wheel velocity with a low-pass filter;
        estimate, using the filtered hand wheel angle and the filtered a hand wheel velocity, a steering rack force caused by a tire of the vehicle and a surface of a ground with which the tire is in contact in response to determining that one or more hand wheel torque sensors of the vehicle are not enabled;
        generate a steering assist torque command based on the estimated steering rack force; and
        control the electric power steering system using the steering assist torque command.

3. The method of claim 1, further comprising:
scaling down a maximum value of torque, which the tire is capable of generating, based on a vehicle velocity; and
using the scaled down maximum value of torque to estimate the steering rack force.

4. The method of claim 1, further comprising:
generating a scale factor using the steering assist torque command and a hand wheel velocity; and
scaling the estimated steering rack force with the scale factor.

5. The method of claim 1, further comprising:
generating a scale factor using the steering assist torque command, a vehicle velocity and a hand wheel angle; and
scaling the estimated steering rack force with the scale factor.

6. The method of claim 1, further comprising:
generating a scale factor using a hand wheel angle and a hand wheel velocity; and
scaling the estimated steering rack force with the scale factor.

7. The method of claim 1, further comprising:
generating a scale factor using the steering assist torque command, a vehicle velocity and a hand wheel angle; and
scaling the estimated steering rack force with the scale factor.

8. The method of claim 1, further comprising:
generating a scale factor using a vehicle velocity; and
scaling the estimated steering rack force with the scale factor.

9. The method of claim 1, further comprising:
generating a first scale factor using the steering assist torque command, a vehicle velocity and a hand wheel angle;
generating a second scale factor using a hand wheel angle and a hand wheel velocity;
generating a third scale factor using the steering assist torque command, a vehicle velocity and a hand wheel angle;
generating a fourth scale factor using a vehicle velocity;
generating a product of the first, second, third and fourth scale factors; and
scaling the estimated steering rack force with the product.

10. The method of claim 1, further comprising:
generating an assist torque command by:
estimating a lateral acceleration of the vehicle based on a hand wheel angle; and
determining an amount of assist torque based on the estimated lateral acceleration; and
blending the two assist torque commands to control the electric power steering system using the blend of the two steering assist torque commands.

11. The system of claim 2, wherein the control module is further configured to:
generate a first scale factor using the steering assist torque command, a vehicle velocity and a hand wheel angle;
generate a second scale factor using a hand wheel angle and a hand wheel velocity;
generate a third scale factor using the steering assist torque command, a vehicle velocity and a hand wheel angle;
generate a fourth scale factor using a vehicle velocity;
generate a product of the first, second, third and fourth scale factors; and
scale the estimated steering rack force with the product.

12. The system of claim 2, wherein the control module is further configured to:
generate an assist torque command by:
estimating a lateral acceleration of the vehicle based on a hand wheel angle; and
determining an amount of assist torque based on the estimated lateral acceleration; and
blending the two assist torque commands to control the electric power steering system using the blend of the two steering assist torque commands.

13. The system of claim 2, wherein the control module is further configured to:
scale down a maximum value of torque, which the tire is capable of generating, based on a vehicle velocity; and
use the scaled down maximum value of torque to estimate the steering rack force.

14. The system of claim 2, wherein the control module is further configured to:
generate a scale factor using the steering assist torque command and a hand wheel velocity; and
scale the estimated steering rack force with the scale factor.

15. The system of claim 2, wherein the control module is further configured to:
generate a scale factor using the steering assist torque command, a vehicle velocity and a hand wheel angle; and
scale the estimated steering rack force with the scale factor.

16. The system of claim 2, wherein the control module is further configured to:
generate a scale factor using a hand wheel angle and a hand wheel velocity; and
scale the estimated steering rack force with the scale factor.

17. The system of claim 2, wherein the control module is further configured to:
generate a scale factor using the steering assist torque command, a vehicle velocity and a hand wheel angle; and
scale the estimated steering rack force with the scale factor.

18. The system of claim 2, wherein the control module is further configured to:
generate a scale factor using a vehicle velocity; and
scale the estimated steering rack force with the scale factor.

\* \* \* \* \*